Oct. 9, 1934.  R. A. KYLE  1,975,958
MOTOR VEHICLE VENTILATOR
Filed March 10, 1933   2 Sheets-Sheet 1
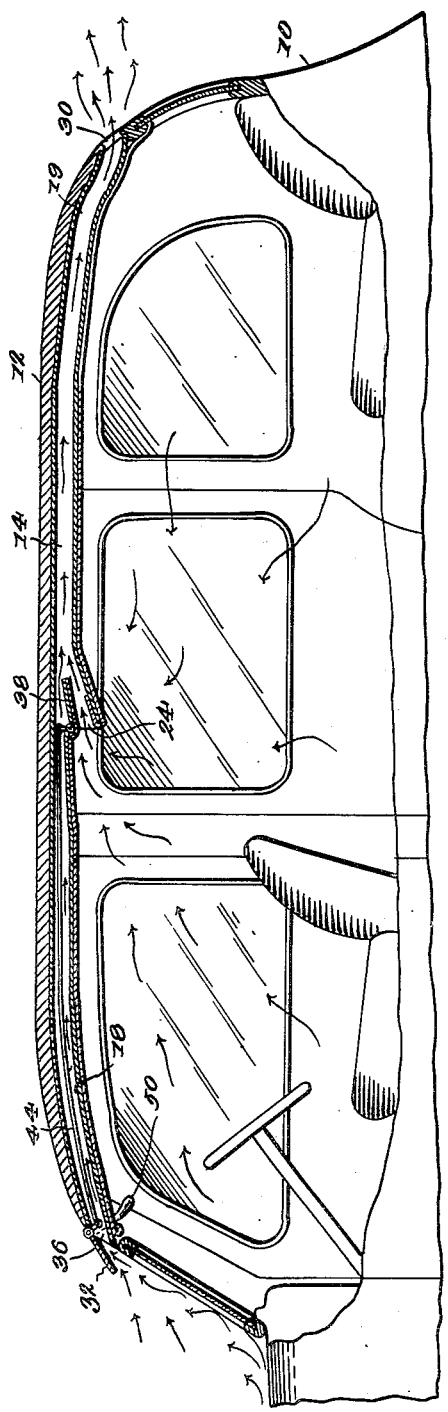
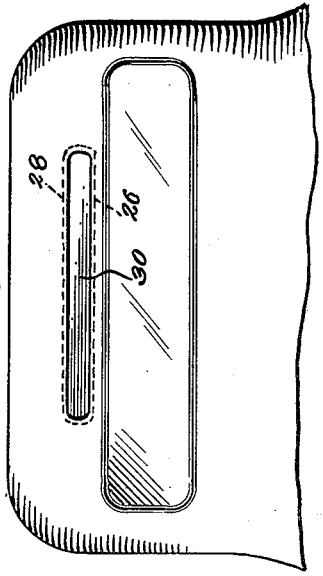
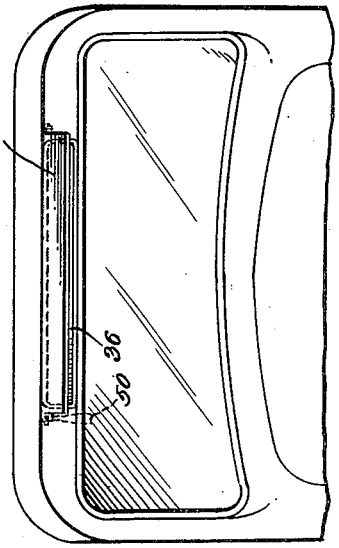
Inventor
RAYMOND A. KYLE
By L. Edw Flaherty
Attorney

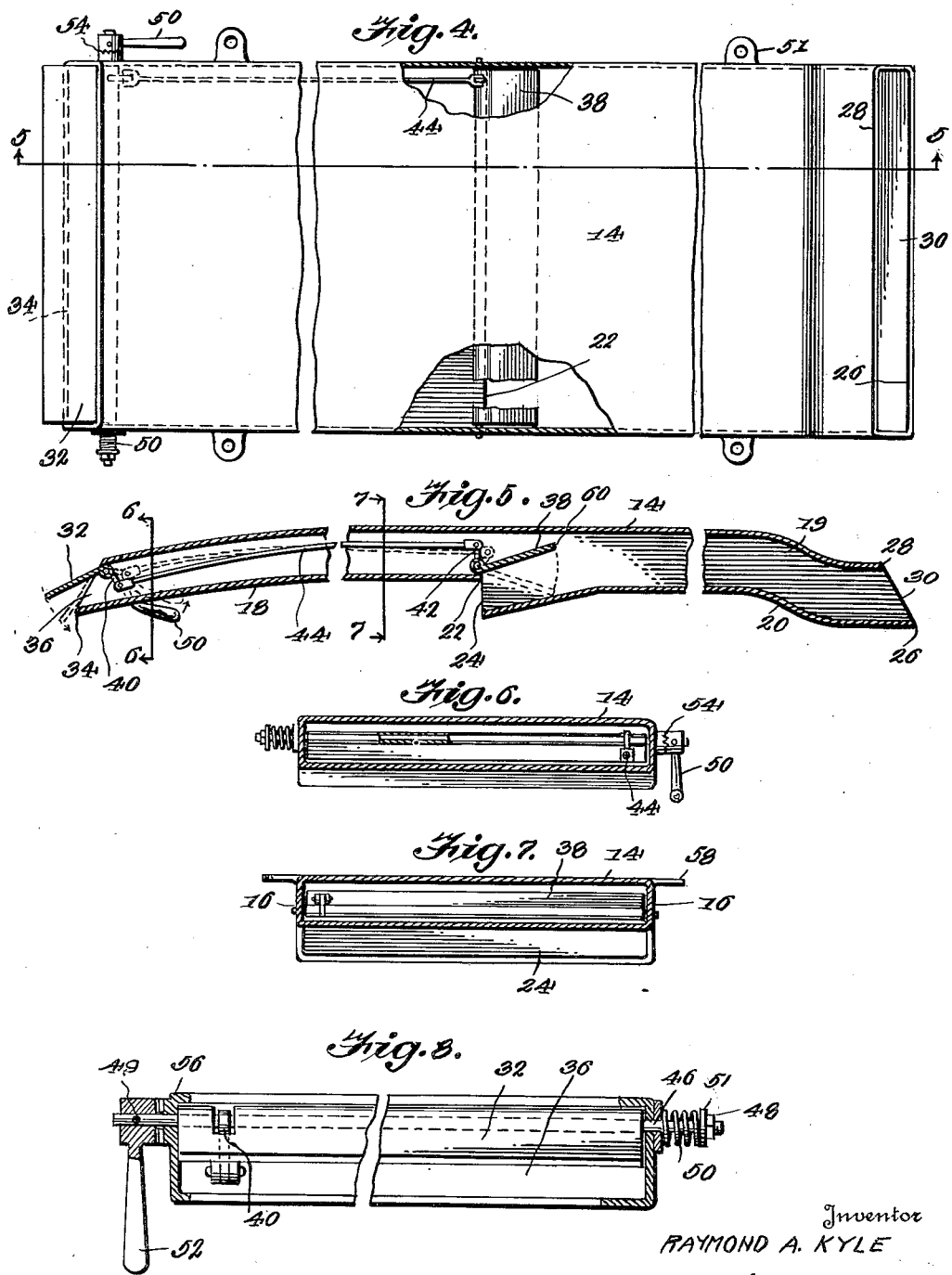

Patented Oct. 9, 1934

1,975,958

UNITED STATES PATENT OFFICE 1,975,958

MOTOR VEHICLE VENTILATOR

Raymond A. Kyle, Breese, Ill.

Application March 10, 1933, Serial No. 660,292

2 Claims. (Cl. 98—2)

The present invention relates to a ventilator, and more particularly, a ventilator especially adapted for motor vehicles and the like.

One of the objects of the present invention is to provide a ventilator for motor vehicles or the like, which will ventilate the interior of the vehicle body without the annoyance of uncomfortable drafts of air to the occupants thereof.

A further important object of the present invention is to provide a ventilator of the class described, which is located in the top of the motor vehicle in such a manner that the entire ventilator with the exception of the evacuating intake port is entirely concealed within the top.

A further important attribute of the invention will be found to reside in the central location of the intake port in the top of the motor vehicle to the end that substantially all of the gases, smoke and the like will be released into the atmosphere.

Another important object of the invention is to provide a ventilator of the class described having a manual control lever, which is disposed in the interior of the body of the vehicle and readily accessible to the driver thereof.

The present invention contemplates the provision of a ventilator adapted to be installed in the top of a motor vehicle having an air intake opening and an evacuating discharge port and a centrally disposed evacuator intake port, the air current passing into the mouth or intake opening of the ventilator and through the evacuator discharge port, the movement of the air current therein causing a suction through the evacuator intake port on the interior of the top of the motor vehicle, removing gases, smoke, and other odors without causing any rapid inward air current or draft in the motor vehicle.

In the accompanying drawings forming a part of this application and in which corresponding parts are represented by like numerals, Figure 1 is an elevational view partly in section of a motor vehicle body, in which the ventilator is installed in the top thereof, Figure 2 is a front elevational view of the body of a motor vehicle showing the position of the mouth, or intake port of the ventilator, Figure 3 is a rear elevational view of a motor vehicle body showing the position of the discharge ports, Figure 4 is a top plan view of the ventilator, Figure 5 is a horizontal sectional view of Fig. 4 taken on line 5—5 looking in the direction of the arrows, Figure 6 is a vertical sectional view of Fig. 5 taken on line 6—6 thereof looking in the direction of the arrows, Figure 7 is a vertical sectional view of Fig. 5 taken on line 7—7 thereof, and Figure 8 is a front elevational view partly in section of the ventilator.

In the accompanying drawings, wherein for the purpose of illustration there is shown a preferred embodiment of the invention, the numeral 10 generally designates an automobile body of the closed type, provided with a top 12 and an interior lining spaced therefrom.

The ventilator comprises a top of metal or any suitable material 14 which is of substantially the same configuration as the top of the body of the motor vehicle, side portions 16, and a bottom. The bottom of the ventilator is divided into two sections. A front section 18 and a rear section 20. The front section extends from the midpoint of the top 14 beyond the front edge thereof and is of the same configuration as the corresponding length of the top portion. The front portion of the rear section 20 extends downwardly and is spaced from the inner edge 22 of the front section of the bottom, defining an evacuation intake port 24.

As clearly illustrated in Figure 5 the rear bottom section 20 follows the general contour of the corresponding top portion but is spaced from the top a greater distance than the front bottom section 18 defining the evacuating chamber 19. The outer edge 26 of the rear bottom section extends beyond the corresponding upper edge 28 of the top so that rain, snow and the like will not be blown into the evacuator chamber when the vehicle is not in motion.

It is also to be noted that the discharge port 30 defined by the upper and lower edge 28 and 26 which open into the back of the body of the vehicle while depending slightly is not sufficiently deflected downward to be in the area of back pressure.

On the inner side of the upper front edge of the top of the ventilator there is pivotally mounted a shutter 32 which when closed is adapted to abut the front edge 34 of the front bottom section 18 to close the ventilator mouth 36. Similarly, a shutter 38 is pivotally mounted on the inner edge 22 of the front bottom section 18 and adapted when in its lowermost position to abut the inner side of the rear lower section 20 to close the evacuator intake port 24.

As illustrated clearly in Figure 5, the shutters 32 and 38 are provided with levers 40 and 42 to which there is pivotally connected a connecting rod 44. The shutter 32 is fixedly secured to a shaft 46 which projects from the sides 14 of the ventilator and on one end thereof is screw threaded a nut 48 for adjusting the tension of the spring 50 disposed between the outer side of the ventilator and the washer 51 adjacent the side.

On the other end of the rod 46 there is securely fastened by means of a pin 49, a handle 52. The handle 52 is provided with serrations 54 cooperating with a ratchet 56 formed integral with the sides 14 of the ventilator. It will thus be seen that upon actuation of the handle 52 the tension of the spring 50 will maintain the shutter in any desired position. As clearly illustrated in Fig. 5, the lever and connecting rod attachment between the shutter 32 and 38 permit of the same degree of opening and closing of the shutters upon the actuation of the handle 52.

The ventilator is centrally disposed in the upper portion of the top of the vehicle body and is securely fastened thereto by means of the ears 58. If so desired, the upholstery of the interior of the body may be constructed to conceal the entire ventilator with the exception of the evacuator intake port 24 and the control lever 52.

When it is desired to ventilate the interior of the car the handle 52 is moved in a direction to open the shutter 32 which at the same time moves the shutter 38 upward to open the evacuator intake port 24. The air then enters the ventilator mouth 36 passing thru the front section of the ventilator through the restricted portion 60 brought about by the upward raising of the shutter 38 causing a suction through the evacuator intake port 24 thereby removing gases, smoke, and odor without causing any rapid inward air current in the form of draft. The gases, smoke and odor then pass through the chamber 19 and the discharge port 30 into the atmosphere. It is to be noted that the position of the evacuator intake port is centrally located with respect to the upper portion of the top of the vehicle and due to the fact that smoke and gases are lighter than air, they will rise to be expelled through the evacuator intake port.

If so desired, the ventilator may as illustrated, be formed as a separate unit, or be constructed in the top of the body of the vehicle during the manufacture thereof.

While there is shown and described only one embodiment of the invention, it is to be specifically understood that it is capable of various changes and modifications without departing from the spirit thereof, and that only such limitations shall be imposed thereon as are indicated in the prior art or the appended claims.

Having thus described the invention what is claimed is:

1. A ventilator for installation in the top of a motor vehicle comprising an open-ended tubular member conforming to the general contour of the top of the motor vehicle and extending throughout the length thereof to define an air passage, said tubular member embodying front and rear sections, the side and bottom walls of said rear section being extended below the corresponding walls of said front section to provide a transversely extending opening communicating with the interior of the motor vehicle, a pivotal control member for the front end of said air passage, a pivotal control member mounted in said air passage adjacent said transversely extending opening for controlling said opening and being movable to a position restricting said air passage, and means for actuating said control members.

2. A ventilator for installation in the top of a motor vehicle comprising an open-ended tubular member conforming to the general contour of the top of the motor vehicle and extending throughout the length thereof to define an air passage, said tubular member embodying front and rear sections, the side and bottom walls of said rear section being extended below the corresponding walls of said front section to provide a transversely extending opening communicating with the interior of the motor vehicle, a pivotal control member for the front end of said air passage, a shutter for said air passage pivotally mounted to the free end of the front section adjacent said transversely extending opening and being movable upwardly toward the top of the tubular member to a position restricting the air passage therebetween, and means for actuating said control member and said shutter.

RAYMOND A. KYLE.